July 13, 1954 E. W. WOYDT 2,683,421
PUMP, MOTOR AND THE LIKE
Filed April 12, 1950 2 Sheets-Sheet 1
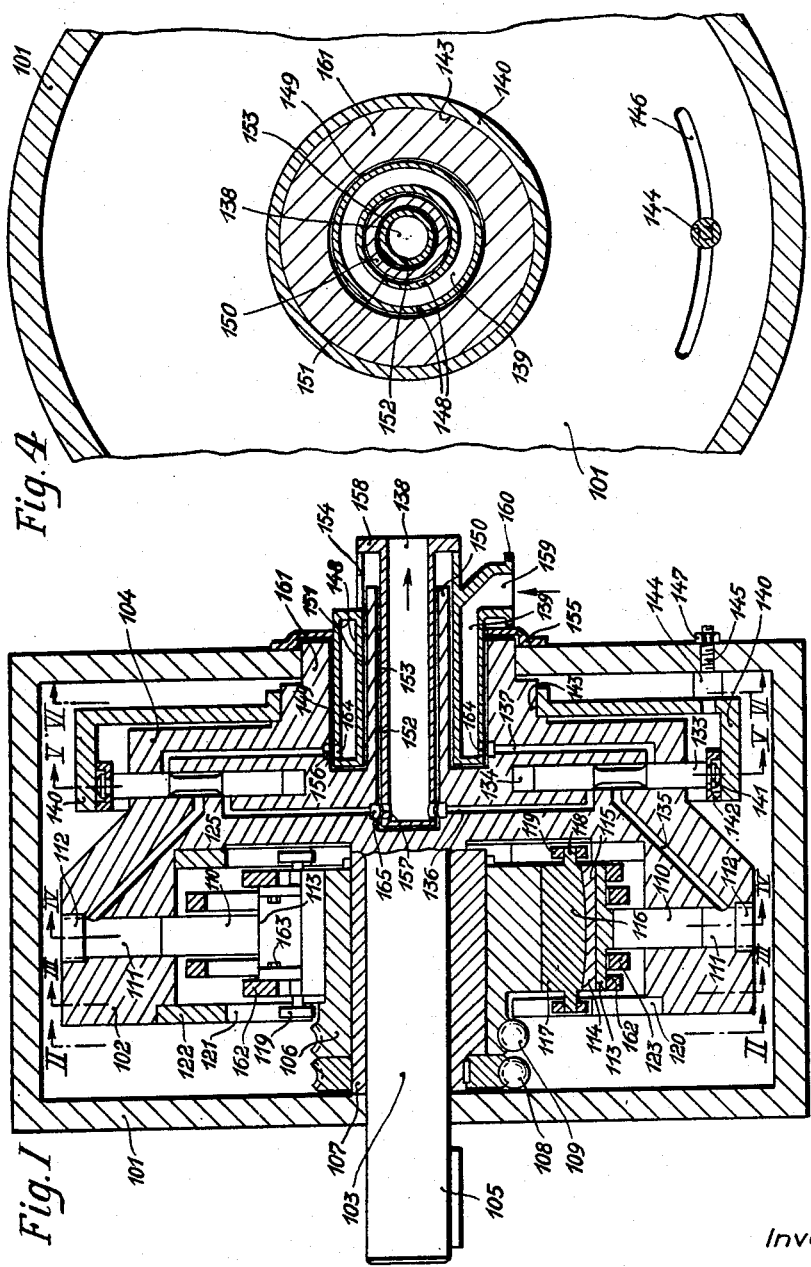
Inventor:
E. Woydt
by
Attorneys July 13, 1954   E. W. WOYDT   2,683,421
PUMP, MOTOR AND THE LIKE
Filed April 12, 1950   2 Sheets-Sheet 2
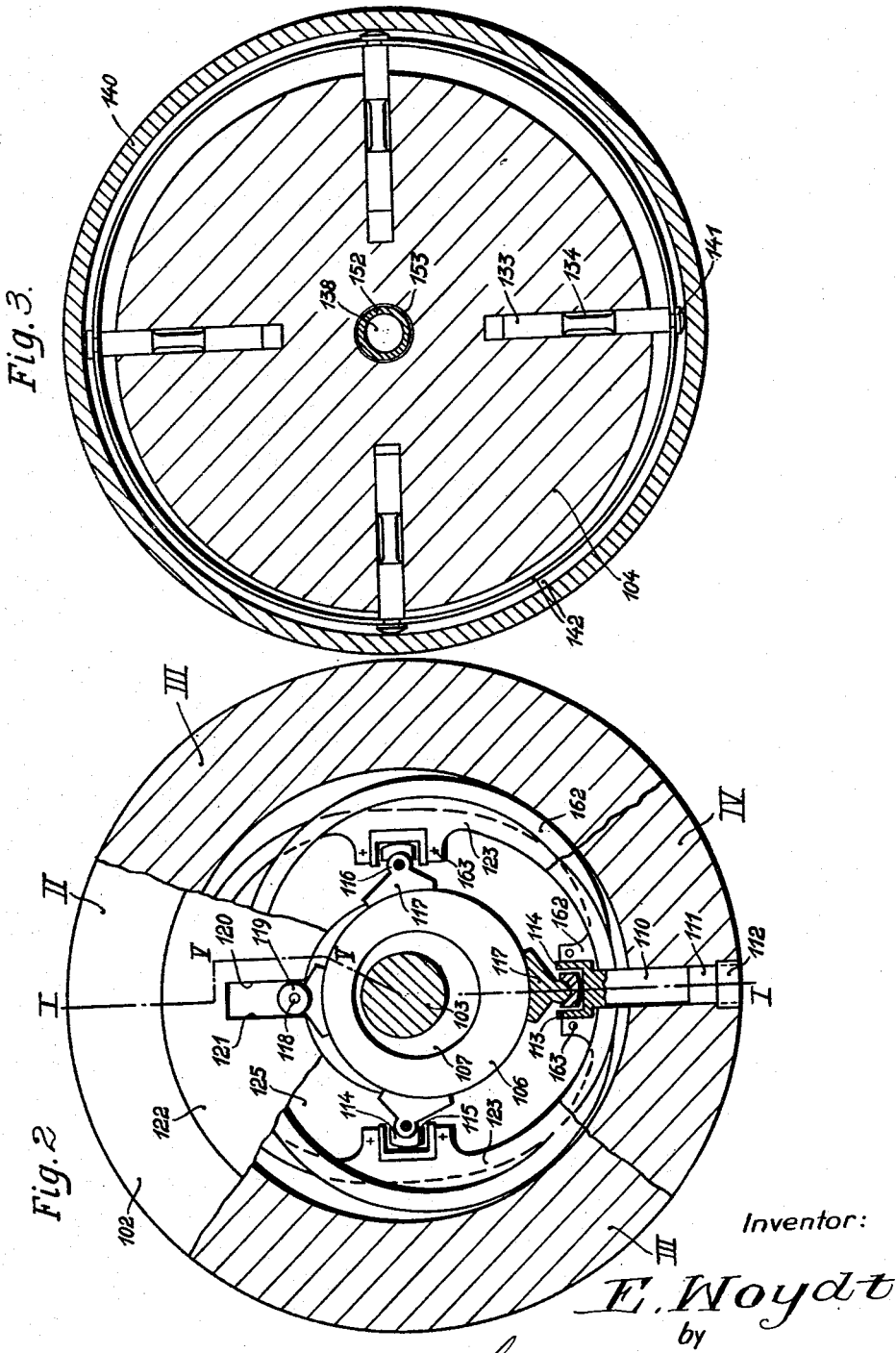
Inventor:
E. Woydt
by
Attorneys Patented July 13, 1954

2,683,421

UNITED STATES PATENT OFFICE 2,683,421

PUMP, MOTOR, AND THE LIKE

Eduard W. Woydt, Stuttgart, Germany

Application April 12, 1950, Serial No. 155,384

Claims priority, application Germany
January 5, 1950

8 Claims. (Cl. 103—161)

In known liquid pumps and motors with radial plungers actuated by means of an eccentric, large pressure forces act between the two constructional parts, viz. an internal and an external part, and these forces are transmitted by means of bearings to the casing or the frame respectively and thereby cause extensive stresses of the bearings which produce great friction in the bearings.

It is known to provide an assembly wherein the casing is provided with radially disposed cylinders and the pistons moving therein being actuated by an eccentric located between the cylinders. The eccentric is carried by a shaft suitably connected to the cylinder block and control members open and close the inlet and outlet passages leading to the cylinders. The eccentric is held stationary with respect to the shaft and is adjustable at a point opposite the means connecting the eccentric to the cylinder block.

However, the prior assembly is only suitable for low pressures whereas the present invention provides a machine which is adapted for use at high pressures, high efficiency and high rotary speeds.

Applicant achieves such ends, inter alia, by providing the control members for the inlet and outlet members or passages in a rotating unitary assemblage.

In an embodiment of the invention there is envisaged an arrangement intended to develop and arrange the control of the working plungers in a particularly suitable manner. Thereby the control devices are constructed in such a manner that they work satisfactorily also with high output, high speed and high pressure.

Subsequently for each working cylinder a control member viz. a plunger slide valve controlled by a fixed eccentric or eccentric ring is arranged on or in the disc connecting the drum and the shaft. A particularly advantageous embodiment results thereby in that said eccentric ring serves as a guide ring which surrounds the disc carrying the plunger slide valves, while the working cylinders located within the drum are driven by means of an eccentric ring mounted on the shaft, preferably by an adjustable double-eccentric, whereby a rotating guide ring may be arranged between the eccentric and the working cylinder.

The supply and discharge of the working liquid to the control members is obtained in such a manner that the disc preferably journalled by means of a hollow shaft receives a supplying or discharging tube which is non-rotatable, whereby any gap between the disc and the discharge tube is sealed by means of a stuffing box or a packing device. The discharge system is arranged in such a manner that an annular recess is preferably provided for the supply connection in the disc in which a double-walled tube is non-rotatably arranged, the disc and the double-walled pipe also being sealed against each other by means of stuffing boxes or packing devices.

In order to obtain a correct centering of the guide ring actuating the control members towards the disc, the guide ring is journalled on the hollow shaft of the disc and secured against rotation by means of a suitable connection with the casing of the pump. This arrangement against rotation may be loosened and adjusted so that the control of the pump can be influenced by adjusting the guide ring of the control members.

The invention has for its further object an advantageous performance of those parts which serve to transmit the pressure from the eccentric to the working plungers. In order to free the working plungers from lateral forces use is made of rotatable rings, hitherto known, which connect each two plungers opposite each other, while the plungers have support on the eccentric ring by means of slidable shoes.

Figure 1 is a vertical section through a pump according to the invention on the line I—I of Figure 2.

Figure 2 shows sections of Figure 1, II being a section on the line II—II, III a section on the line III—III and IV being a section on the line IV—IV of Figure 1.

Figure 3 is a section on the line V—V of Figure 1, and

Figure 4 is a section on the line VI—VI of Figure 1.

In the example according to Figures 1 to 4, the cylinder block is journalled within a casing 101 of a pump. This cylinder block consists of a drum 102 and a shaft 103 rigidly connected with the drum 102 by means of a disc-shaped member 104. Opposite the shaft 103 the cylinder block is provided with a hollow shaft 161 which is journalled within the casing 101 like the shaft 103. The end 105 of the shaft 103 serves for driving the pump. A double-eccentric 106, 107 is mounted on the shaft 103 and is adapted to be adjustable by means of worm gears 108 and 109. The double-eccentric serves to drive the plungers 110 slidable in cylinders 111 of the drum 102. The cylinders extend to the circumference of the drum 102 but are closed there by means of closing plugs 112. The plunger 110 is provided with a transverse head 113 rigidly connected with a similar transverse head 113 of the opposite plunger 110 by means of two rings 162 in such a manner that the plungers 110 are kept from oblique displacement in their cylinders thus preventing wear therebetween. The transverse heads 113 are connected with the ring 162 by means of bolts 163. A rocking member 114 is located in the transverse head 113 and is movable on the transverse head 113 by means of a cylindrical face 115. The rocking member is provided with a cylindrical cavity shaped symmetrically in the rotating direction in which a head 116 provided with a slide shoe 117 is capable of swivelling. The diameter of the symmetrically formed head 116 increases from the outside to the inner side. The slide shoe 117 carries on its pivots 118 rollers 119 for running on guideways 120 and 121. These latter are arranged on rings 122 and 125 rigidly connected with the drum 102. The rocking member 114 has some clearance in the transverse head 113 of the plunger (see Figures 1 and 2) so that the tangential component of the pressure transmitted from the eccentric 106 to the plunger 110 can freely be transmitted to the guideways 120 or 121 respectively. The second pair of plungers not illustrated in Figure 2 are rigidly connected to each other by means of rings 123 in a corresponding manner.

Control valves 133 control the working plungers 110 and are arranged movably in cylindrical bores 134 in the disc 104 of the cylinder block. Channels 135 connect the working cylinders 111 with the control cylinders 134, while channels 136 and 137 connect the control cylinder 134 with the pressure line 138 or the supply line 139 respectively.

The arrangement is such that the control slide valves 133 close all channels towards each other in the middle position shown in Figure 1, but when sliding towards the inner side they effect communication of the channel 135 with the channel 136 and when sliding towards the outer side they effect communication of the channel 135 with the channel 137. An eccentric guide ring 140 serves to control the control slide valves 133 and engages the head 141 of the latter by means of angle rings 142. The eccentric ring 140 is centrally journalled at 143 on a hollow shaft 161 of the cylinder block and is fixed by a set screw 144 and nut 147, the neck 145 of which screw is movably mounted within a slot 146 of the casing 101. The ring 140 will be secured towards the casing by tightening the nut 147. Within the hollow shaft 161 there is an annular recess in which a double-walled tube 148 is fitted and sealed towards the hollow shaft 161 by means of a packing device 149 and also towards a second shaft 150 rigidly connected with the cylinder block by means of a packing device 151. A tube 152 is located within the hollow shaft 150 and also sealed towards the hollow shaft 150 by means of a packing device 153. The double-walled tube 148 as well as the tube 152 remain at rest during the work of the pump and are connected with each other on the outside of the casing 101 by means of cover plates 154 as well as with the casing 101 by means of a flange 155. On the circumference of the double-walled tube 148 is arranged an annular groove 156 connecting the channels 137 and communicating with a suction pipe 159 through holes 164 within the double-walled tube 148. A corresponding annular groove 165 connecting the channels 136 is provided around the tube 152 which has two or more holes 157 within the range of said annular groove. The tube 152 is provided with a flange 158 with which the pressure piping communicates, while an inlet 139 and a flange 160 connect with the supply piping.

It will be understood that the pivoting arrangement of the slide shoe 117 provided with rollers 119 in the rocking member 114 arranged on the plunger transverse head 113 may also be used advantageously in engines which operate in another manner than that described above. The shaft of the unitary assembly can bend under high liquid pressure which acts upon the pistons of one side of the pump or motor. Thus, the sliding shoes are slightly swingable axially with respect to the pistons 110 guidable in the cylinders 111.

I claim:

1. In a hydraulic pump or motor, a casing, a cylinder block within the casing, radially disposed cylinders in the cylinder block, a piston movable in each cylinder, an eccentric located between the cylinders for actuating the pistons, a shaft extending into the casing and supporting the said eccentric, a disc-shaped member within the casing, means defining a rigid connection between the shaft, disc-shaped member and the cylinder block thereby providing a unitary assemblage consisting of the block, shaft and disc-shaped member, means constituting inlet and outlet passages in said unitary assemblage leading to and from the said cylinders, control elements in said unitary assemblage to control the opening and closing of said passages, each control element being in proximity to a cylinder and means associated with said eccentric to adjust the position thereof on said shaft.

2. A hydraulic pump or motor as defined in claim 1 further characterized in that an eccentric guide ring journalled on a shaft within the casing cooperates with said control elements to move such elements.

3. A hydraulic pump or motor as defined in claim 2 further characterized in that said control elements are slide valves located in the disc-shaped member and the pistons move in cylinders formed in a drum which defines part of the cylinder block and said eccentric moving the pistons being a double eccentric.

4. A hydraulic pump or motor as defined in claim 1 further characterized in that said disc-shaped member is provided with a hollow shaft having connections adapted to be associated with liquid supply and discharge conduits and a sealing device for said disc-shaped member and each connection.

5. A hydraulic pump or motor as defined in claim 1 further characterized in that said disc-shaped member is provided with a hollow shaft having connections adapted to be associated with liquid supply and discharge conduits and a sealing device for said disc-shaped member and each connection, said disc-shaped member having an annular recess in which said connections are non-rotatably disposed.

6. A hydraulic pump or motor as defined in claim 1 further characterized in that each piston is provided with a transversely disposed head, the heads of every two pistons arranged opposite each other being connected by two laterally disposed rings.

7. A hydraulic pump or motor as defined in claim 1 further characterized in that a drum forming part of the said cylinder block is provided with the cylinders, said drum having rings with lateral guideways, the pistons each having transversely disposed heads with a rocking member located therein, a shoe swingably mounted in said rocking member and movable against said eccentric, said shoe carrying rollers for transmitting tangential forces onto said lateral guideways.

8. A hydraulic pump or motor as defined in claim 1 further characterized in that a drum forming part of the said cylinder block is provided with the cylinders, the said drum having rings with lateral guideways, the pistons each having transversely disposed heads with a rocking member located therein, a shoe swingably mounted in said rocking member and movable against said eccentric, said shoe carrying rollers for transmitting tangential forces onto said lateral guideways, said rocking member having a cavity carrying a head by means of which the shoe is journalled in said rocking member.

References Cited in the file of this patent

UNITED STATES PATENTS

| Number | Name | Date |
|---|---|---|
| 1,308,436 | Maw et al. | July 1, 1919 |
| 1,709,194 | Hele-Shaw et al. | Apr. 16, 1929 |
| 1,757,483 | Hele-Shaw et al. | May 6, 1930 |
| 1,778,238 | Wilsey | Oct. 14, 1930 |
| 2,115,121 | Phillips | Apr. 26, 1938 |
| 2,141,167 | Bishof | Dec. 27, 1938 |
| 2,159,005 | Centervall | May 23, 1939 |
| 2,257,792 | Fletcher | Oct. 7, 1941 |
| 2,418,123 | Joy | Apr. 1, 1947 |